Nov. 21, 1972  T. J. SARGENT  3,703,433
MOLDED GRANITE
Filed May 26, 1971
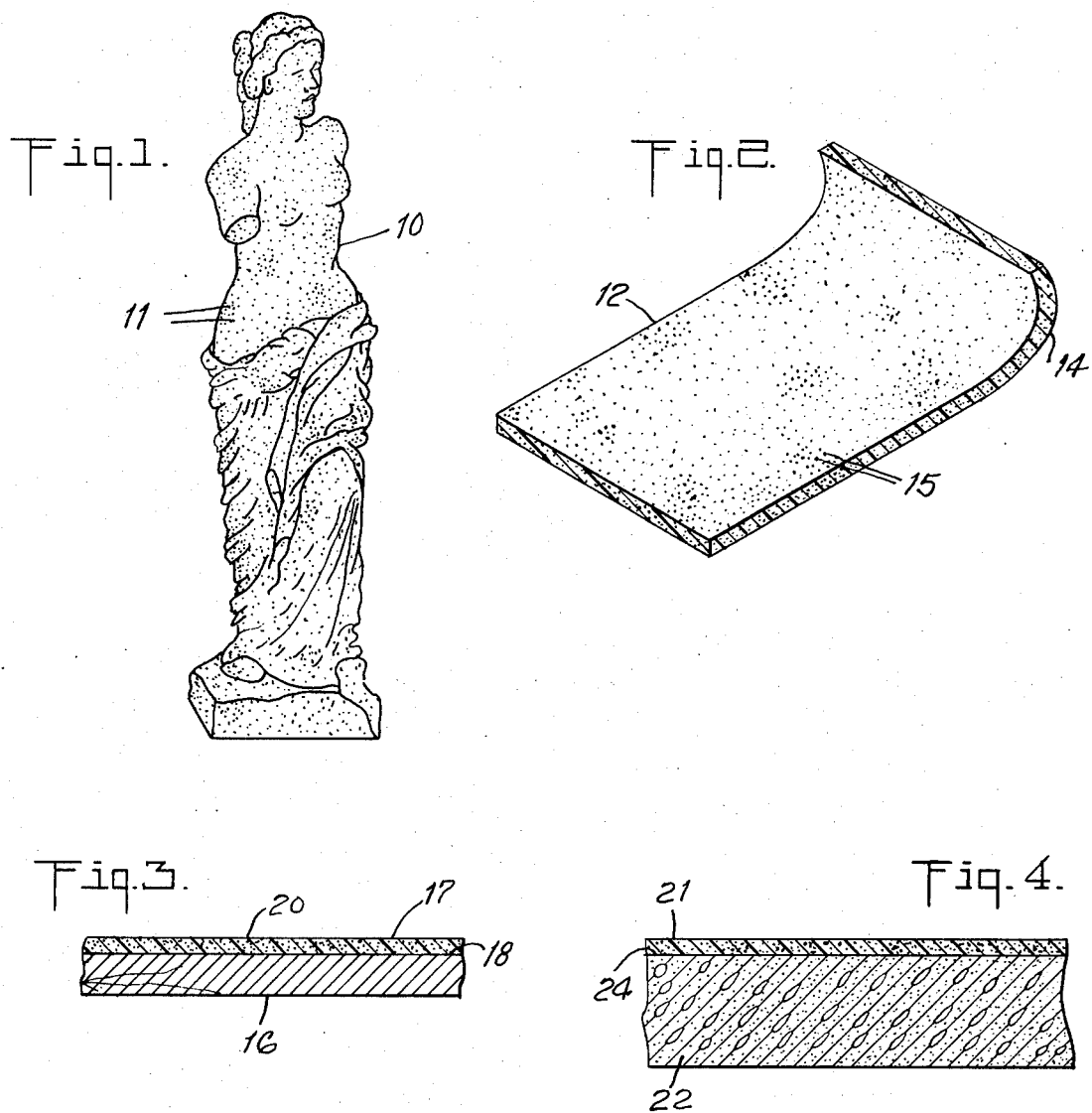
INVENTOR.
THOMAS J. SARGENT
ATTORNEY.
Thomas N. Tarrant

3,703,433
MOLDED GRANITE
Thomas J. Sargent, Rte. 1, Box 319,
Milford, N.H. 03055
Filed May 26, 1971, Ser. No. 146,891
Int. Cl. B32b 5/16, 19/02
U.S. Cl. 161—162                                                           8 Claims

ABSTRACT OF THE DISCLOSURE

Molded products comprising flaked natural granite mixed with a resinous binder and cast or molded in or with molds of high surface finish whereby the molded products have the appearance of polished granite.

BACKGROUND OF THE INVENTION

(1) Field of the invention

The invention relates to synthesized stone products produced from the wastes of quarrying and in particular to synthetic granite.

(2) Description of the prior art

Granite is a valued natural product in that it has great strength and durability as well as a unique and attractive pepper and salt appearance. It is also prized for its ability to take a high polish. In the quarrying of granite, the tools utilized produce a substantial quantity of powdered granite which has been considered a waste product.

The stone dust resulting from quarrying processes has been utilized in the past by mixing it with cement and casting it or otherwise utilizing much in the manner of concrete. See for example U.S. Pat. No. 347,861 using pulverized granite and 2,572,510 using powdered marble. These known compositions do not lend themselves to any ready means providing polished surfaces nor do they give the appearance of the natural product.

SUMMARY OF THE INVENTION

Modern quarrying processes make use of a technique of thermal working known as "jet-piercing" and "jet-channeling" in which a high velocity flame causes thermal expansion of the stone surface which cracks and flakes. I have found that the flakes so obtained when mixed with a resinous binder can be molded to achieve an appearance remarkably similar to the natural product. This has been found so particularly with granite when the use of high finish molds yields a molded product with the appearance of highly polished natural granite.

The granite content gives the molded product many of the durability and strength characteristics of granite as well as its substantial appearance. Molding in thin sheets provides floor surfaces, tabletop laminates and wall surfacing of remarkable appearance and durability.

Thus, it is an object of the invention to provide molded products of granite flakes in a resinous binder having a highly polished appearance.

It is a further object of the invention to provide durable compositions of granite and binder resin.

It is still a further object of the invention to provide granite-like compositions in flexible laminateable sheets.

Further objects and features of the invention will become apparent upon reading the following description together with the drawing.

BRIEF DESCRIPTION OF THE DRAWING

FIG. 1 is a perspective view of a sculptoresque casting in accordance with the invention;

FIG. 2 is a perspective view of a laminateable sheet in accordance with the invention;

FIG. 3 is a view in cross-section of a layer of granite-like material according to the invention laminated with a backing board; and, FIG. 4 is a section of concrete flooring having a granite-like surface layer according to the invention.

DESCRIPTION OF A PREFERRED EMBODIMENT

In granite quarries today, much of the cutting and shaping of the stone is performed by devices producing high velocity flames. Typical of these are jet-piercing blowpipes, and stone shaping torches sold by Linde Company, Division of Union Carbide Corporation, 270 Park Ave., New York, N.Y. 10017. These devices employ a high-velocity flame produced by burning a mixture of oxygen and vaporized fuel in a restricted water-cooled chamber. The high-velocity flame causes thermal expansion of the stone surface, which then cracks and flakes away. The flakes have a typical size range that will pass through a 17 mesh per inch screen.

For purposes of the invention, the flaked quarry residue is mixed with a synthetic resin binder. It has been determined that a hardened mixture retains a substantial portion of the granite characteristics if it is in the range of 70% to 90% by weight granite flakes. With less granite, the resin betrays significant characteristics to the mixture. With more than 90% granite, it is very difficult to obtain through "wetting" of all the particles. The percentage of binder resin required to wet-out the granite flakes to a workable viscosity varies within the range of 10% to 30% by weight depending on the particular resin. While the range of granite flakes has been described in terms of the overall mixture, the percentage necessary for the invention is only critical in the finished surface of the final product. Thus other mixtures can readily be utilized in the bulk of the product or at unfinished surfaces.

Preferred binder resins are thermosetting liquid compositions which cure without evolution of subtsantial volatile byproducts and thermoplastics which are heated to the desired working viscosity and harden on cooling. These materials are preferred since they minimize molding problems of shrinkage and bubbled effects and they produce little or no deleterious vapor in processing.

Among the preferred resins are thermosetting epoxies, unsaturated polyesters, silicone rubber, and urethane rubber; and thermoplastic saturated polyesters, polyamides, polyethylene, ethylene copolymers and amorphous polypropylene.

After mixing the granite flakes and resin by known methods such as mechanical and sonic agitation, the mixture is poured into molds, pressed by molding presses or otherwise molded as for example by being passed between forming rollers.

In FIG. 1 a sculpturesque statuette is depicted cast from granite flakes and resin binder. This statuette was cast in a mold of silicon rubber with good release properties with respect to the epoxy resin used as a binder. The satuette has a smooth high gloss surface 10 with the randomly distributed dark particles 11 typical of granite.

FIG. 2 depicts a flexible sheet formed between two rollers. The sheet, made of granite flakes and binder resin, is formed to a thickness of less than one quarter inch. Greater thicknesses are too heavy, rigid and costly, to make desirable laminates. Sheet 12 about one eighth inch thick using one of the more flexible synthetic resin binders, can be bent at a 90 degree angle with a ½ inch radius of curvature without cracking. Bend 14 in sheet 12 depicts this flexibility. Dark particles 15 give the characteristic granite appearance. One method by which sheet 12 may be formed is by placing the uncured mass between plastic sheets of high release properties with respect to the binder resin and then passing the whole between rollers. Sheets of Mylar,, Teflon or polyethylene are usually suitable for this purpose.

A granite-like sheet according to the invention can be formed as a laminate with backing board 16 as in FIG. 3. Cellulosic backing boards such as plywood or fiberboard are suitable for this purpose. The uncured mass can be applied to the backing board and then the whole can be passed between rollers with a layer of plastic having good release properties bearing against the granite-resin mass. Alternatively a layer of high release plastic can be placed over the granite-resin mass on the backing board and a pressure roller passed over the layer. The layer with the release properties should preferably remain in contact with the granite-resin mass during curing to obtain a high surface finish.

After curing, sheet 17 adheres to backing board 16 at interface 18 and when the layer of high release plastic is removed, surface 20 carries a high gloss or other surface appearance of the layer of high release plastic.

FIG. 4 depicts granite-like sheet 21 according to the invention laminated to concrete floor structure 22. This construction can be obtained by adhesively bonding flexible sheets, such as that described with reference to the embodiment of FIG. 2, to the concrete. Alternatively the sheet 21 can be cast in place by applying the uncured granite-resin mass uniformly to concrete surface 24, covering the granite-resin mass with a high release plastic layer and then curing. When the plastic layer is removed, the granite-like surface of sheet 21 has a surface characteristic similar to the plastic layer. While in most cases it has been found most desirable to have a high gloss "polished" surface, with respect to flooring this can be dangerously slipper. A slight "matt" effect, introduced from a plastic layer having that characteristic, can reduce the danger of slipping while retaining some of the polished appearance.

While the invention has been described with respect to specific embodiments, its is not intended to be limited thereby. For example, the true natural granite appearance can readily be varied by adding coloring material to the resin and thus producing pleasing tints in contrast to the stark black and white usually associated with granite. Also, it is contemplated to mold the inventive product into other forms such as bowls, decorative molding strips and the like. The invention has further particular value for molding patches in place on damaged granite products.

Thus, it is intended to cover the invention broadly within the spirit and scope of the appended claims.

I claim:

1. A molded granite product comprising a molded mixture of granite flakes, produced from natural granite by high velocity flame thermal rock working apparatus, and synthetic resin binder in which at least the finished surface comprises in the range of 70% to 90% of said granite flakes by weight of the mixture.

2. A molded granite product according to claim 1 in which said synthetic resin binder is a two part mixture which hardens by catalytic action after mixing.

3. A molded granite product according to claim 1 in which said product is a sculpturesque image.

4. A molded granite product according to claim 1 in which said product is in the form of a flexible sheet less than one quarter of an inch in thickness.

5. A molded granite product according to claim 1 comprising a layer molded in place adherent to a concrete substructure.

6. A surface layer for floors, walls and tabletops comprising a hardened mixture in the range of 70% to 90% by weight natural flaked granite in a synthetic resin binder having the visible appearance of natural granite.

7. A surface layer according to claim 6 in which the surface has the appearance of polished natural granite.

8. A surface layer according to claim 6 in which said mixture forms a laminate with a backing of cellulosic board.

References Cited
UNITED STATES PATENTS 3,150,032  9/1964  Rubenstein _____ 161—162

WILLIAM J. VAN BALEN, Primary Examiner

U.S. Cl. X.R.

161—165, 168, 182, 250